V. LOFBERG.
LEVEL.
APPLICATION FILED JUNE 5, 1911.
1,012,668.
Patented Dec. 26, 1911.
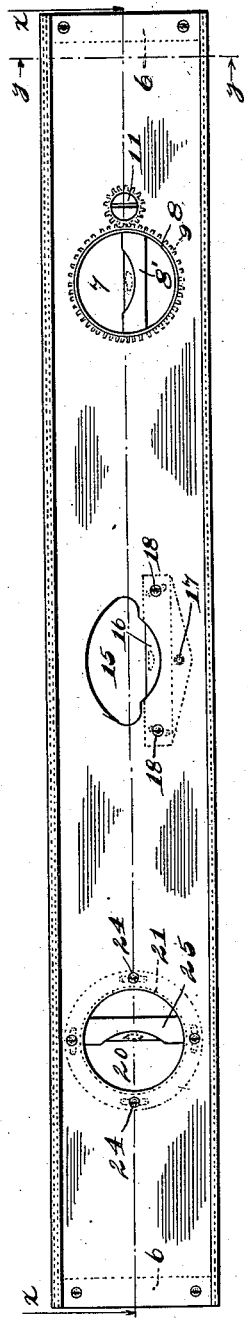
Witnesses:
C. E. Wessels
B. G. Richards
Inventor:
Viktor Lofberg,
By Joshua R. H. Potts
his Attorney.

UNITED STATES PATENT OFFICE.

VIKTOR LOFBERG, OF CHICAGO, ILLINOIS.

LEVEL.

1,012,668. Specification of Letters Patent. Patented Dec. 26, 1911.

Application filed June 5, 1911. Serial No. 631,437.

*To all whom it may concern:*

Be it known that I, VIKTOR LOFBERG, a citizen of the United States, and a resident of the city of Chicago, county of Cook, and State of Illinois, have invented certain new and useful Improvements in Levels, of which the following is a specification.

My invention relates to improvements in levels and has for its object the provision of an improved level of simple construction and efficient in operation.

The invention consists in the combinations and arrangements of parts hereinafter described and claimed.

The invention will be best understood by reference to the accompanying drawing forming a part of this specification, and in which, Figure 1 is a side elevation of a level embodying my invention, Fig. 2, a horizontal section of the level taken on line $x$—$x$ of Fig. 1, Fig. 3, a vertical section of the level taken on line $y$—$y$ of Fig. 1, Fig. 4, a detail side elevation of a horizontal leveling tube, Fig. 5, a detail side elevation of a vertical leveling tube and its mounting, and Fig. 6, an enlarged detail section illustrating the construction for mounting one of the leveling tubes in the body of the level.

The preferred form of construction as illustrated in the drawing comprises a body formed of a single piece of sheet metal bent into the form of an I-beam having an integral base 1 and separated vertical stem forming portions 2, the upper ends of portions 2 being bent outwardly to form flanges 3. A cover plate 4 is provided with downwardly and inwardly bent flanges 5 adapted to slidably engage flanges 3. Blocks 6 are secured in each end of the level body between portions 2 and serve to close the space between said portions against the entry of dirt or moisture and also to stiffen and strengthen the construction.

Near one end registering circular perforations 7 are formed in portions 2 and a wheel or band 8 is rotatably fitted in said perforations. Gear teeth 9 are formed on the periphery of wheel 8 and closely fit the space between portions 2, thus serving to retain the wheel 8 in position. A rotatable arbor 10 is mounted in the body of the level adjacent wheel 8. At one end arbor 10 is provided with a screw driver slotted head 11 taking against the outer side of one of the stem portions 2 and at its other end said arbor is provided with a threaded stud 12 projecting through the other stem portion 2. A nut 13 engages stud 12 and serves as a means for securing arbor 10 against rotation. Arbor 10 carries a pinion 14 meshing with gear teeth 9. Wheel 8 carries a leveling tube 8' of any usual or desired construction. By this construction it will be observed that by loosening nut 13 and turning arbor 10 by means of a screw driver, the leveling tube 8' may be adjusted to any desired angle relatively to the body of the level and thus the level may be employed for use at any desired angle. When leveling tube 8' is adjusted to the proper angle it may be locked in such adjusting position by tightening nut 13.

At the center registering perforations 15 are provided in stem portions 2 and a horizontal leveling tube 16 is mounted between portions 2 so as to be visible through openings 15. Leveling tube 16 is pivotally mounted at 17 and is held in position by means of bolts 18 passing through segmental slots 19 in the ends of the frame 19' in which leveling tube 16 is mounted. By this arrangement it will be observed that tube 16 may be adjusted to exact parallelism with the top and bottom edges of the level and locked in such position by means of bolts 18.

Near the other end of the level portions 2 are provided with registering circular sight openings 20 and a wheel or band 21 is mounted between portions 2 in register with said openings. The wheel 21 is provided with outwardly extending flanges 22 having segmental slots 23 therein. Bolts 24 are passed through portions 2 and slots 23 and serve as a means for adjustably securing wheel 21 in position. A vertical leveling tube 25 is mounted in wheel 21 and may be of any usual or desired construction. By this arrangement it will be observed that tube 25 may be readily adjusted to a position exactly perpendicular to the top and bottom edges of the body of the level.

While I have illustrated and described the preferred form of construction for carrying my invention into effect, this is capable of variation and modification without departing from the spirit of the invention. I therefore do not wish to be limited to the precise details of construction set forth, but desire to avail myself of such variations and modifications as come within the scope of the appended claims.

Having described my invention what I claim as new and desire to secure by Letters Patent is:

1. A level comprising a body consisting of a piece of sheet metal bent into the form of an I-beam with an integral base and outwardly turned flanges at the top, the portions of said sheet metal piece constituting the stem of said I-beam being separated to form a space between them and said stem portions being provided with registering sight openings; a cover plate slidably engaging said flanges; and a leveling tube mounted between said stem portions at said openings, substantially as described.

2. A level comprising a body consisting of a piece of sheet metal bent into the form of an I-beam with an integral base and outwardly turned flanges at the top, the portions of said sheet metal piece constituting the stem of said I-beam being separated to form a space between them and said stem portions being provided with registering sight openings; a cover plate slidably engaging said flanges; and a leveling tube adjustably mounted between said stem portions at said openings, substantially as described.

3. A level comprising a body consisting of a piece of sheet metal bent into the form of an I-beam with an integral base and outwardly turned flanges at the top, the portions of said sheet metal piece constituting the stem of said I-beam being separated to form a space between them and said stem portions being provided with registering sight openings; a cover plate slidably engaging said flanges; a wheel rotatably mounted between said stem portions in register with said openings; gear teeth on the periphery of said wheel; a rotatable arbor mounted in said body between said stem portions; a pinion on said arbor meshing with said gear teeth; and means for locking said arbor against rotation, substantially as described.

4. A level comprising a body consisting of a piece of sheet metal bent into the form of an I-beam with an integral base and outwardly turned flanges at the top, the portions of said sheet metal piece constituting the stem of said I-beam being separated to form a space between them and said stem portions being provided with registering sight openings; a cover plate slidably engaging said flanges; a wheel rotatably mounted between said stem portions in register with said openings; gear teeth on the periphery of said wheel; a rotatable arbor mounted in said body between said stem portions; a pinion on said arbor meshing with said gear teeth; a screw driver slotted head on one end of said arbor and projecting from one side of said body; a threaded stud on the other end of said arbor projecting from the other side of said body; a nut on said stud, and adjustable vertical and horizontal leveling tubes mounted on said body, substantially as described.

In testimony whereof I have signed my name to this specification in the presence of two subscribing witnesses.

VIKTOR LOFBERG.

Witnesses:
HELEN F. LILLIS,
JOSHUA R. H. POTTS.

Copies of this patent may be obtained for five cents each, by addressing the "Commissioner of Patents, Washington, D. C."